Sept. 21, 1926.  O. F. HIPKINS  1,600,589
TRACTION DEVICE
Filed March 21, 1925  2 Sheets-Sheet 1

Inventor
Otho F. Hipkins

By John W Darley
Attorney

Sept. 21, 1926.                    O. F. HIPKINS                          1,600,589
                                   TRACTION DEVICE
                              Filed March 21, 1925         2 Sheets-Sheet 2

Inventor
Otho F. Hipkins
By John W Darley
    Attorney

Patented Sept. 21, 1926.

1,600,589

UNITED STATES PATENT OFFICE.

OTHO F. HIPKINS, OF PORT DEPOSIT, MARYLAND, ASSIGNOR OF ONE-HALF TO L. C. HARWARD, OF PORT DEPOSIT, MARYLAND.

TRACTION DEVICE.

Application filed March 21, 1925. Serial No. 17,415.

To produce a traction device of the character described which obviates the necessity of a positive locking thereof to the wheel by chains or otherwise, the driving connection between said wheel and device being obtained by a gear-like action of the element, or elements, thereof sustaining the load at any instant and the elastic tread of said wheel.

To produce a device of the character described, the elements of which are characterized by a self-cleaning property, insuring their freedom from mud caking and thus preserving their maximum tractive effort at all times.

To provide a device of the character described which is provided with special means for compensating for tread wear and which is further so constructed and arranged that during operation, said device will creep around the tread of said wheel, thereby preventing undue wear at separated portions of the tread and of the elements composing the device.

My invention is an improvement on the device illustrated and described in my copending application, Serial No. 691,677, filed February 9, 1924 and is particularly designed to provide a traction device that is characterized by an absence of any requirement for a positive locking to a vehicle wheel in order to secure the driving connection therewith. This result is achieved by providing each shoe, a plurality of which comprises my improved traction device, with a corrugated surface adjacent the tread of the wheel, said tread being preferably formed of an elastic compound such as rubber. Therefore, when any shoe, or shoes, is interposed between said tread and the ground, thereby sustaining the load of the vehicle, the elastic material comprising the tread will be depressed and will flow into the depressions of said corrugations. I have ascertained that this gear-line connection is sufficient under most conditions to effect a driving engagement between the tread and the shoe, thus rendering unnecessary the use of chains or other similar connection with the body of the wheel.

Due to the absence of the latter type of driving connection with the wheel, my traction device is characterized by an ability to slowly creep around the tread of the wheel during the latter's continued revolution. It follows therefore, that excessive wear at separated portions of the tread and of the elements composing the tread, is entirely eliminated, a factor which has heretofore been limited to the use of the socalled nonskid chains with pneumatic tires. My device renders possible the application of this principle to vehicles of a heavier nature.

The peculiar pivotal action of the shoes relative to the tread, which is illustrated and described in the foregoing application, is also utilized in the device of the present application. In addition I have so constructed the shoes that their contact with the ground does not create a vacuum with the material enclosed by said shoe and therefore, I am enabled to prevent any caking of the mud therein which serves to preserve the tractive effort of said shoe. Means are also provided for compensating for the slack in the assembly of shoes around the tread occasioned by wear of the latter.

These and further objects of my invention will be set forth in the accompanying specification, reference being had to the drawings, and the novel means by which said objects are effectuated will be definitely pointed out in the claims.

In the drawings:—

Figure 5:
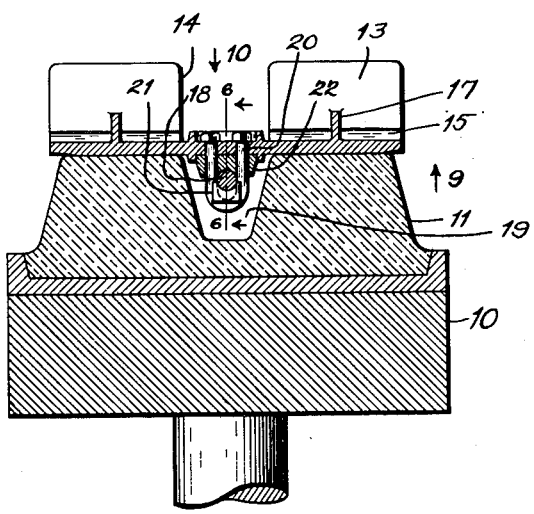
Fig. 5 is a view similar to Fig. 3, but showing the shoe mounted on the tread of a wheel.
Figure 6:
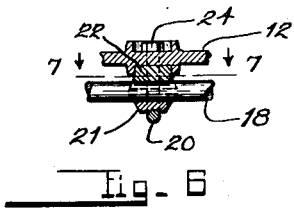
Fig. 6 is a section along the line 6—6 in Fig. 5 looking in the direction of the arrows.
Figure 7:
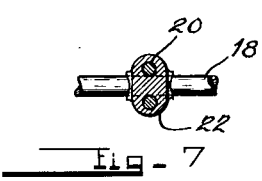
Fig. 7 is a section along the line 7—7 in Fig. 6 looking in the direction of the arrows.
Figure 10:
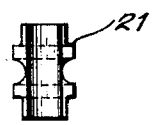

Fig. 10 is a view of a portion of Fig. 5 looking in the direction of the arrow 10 in said figure.

Figure 11:
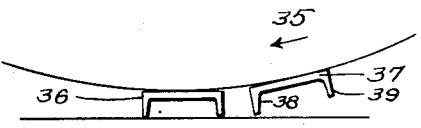
Figure 9:
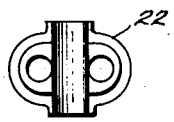
Fig. 9 is a view of a portion of Fig. 5 looking in the direction of the arrow 9 in said figure.
Figure 12:
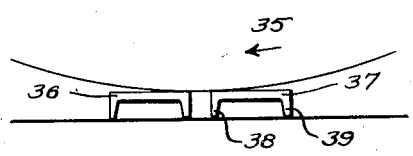

Figs. 11 and 12 are diagrammatic views showing the action of the shoes comprising my device, due to their pivotal connection to the wheel.

In the drawings:—

Figure 3:
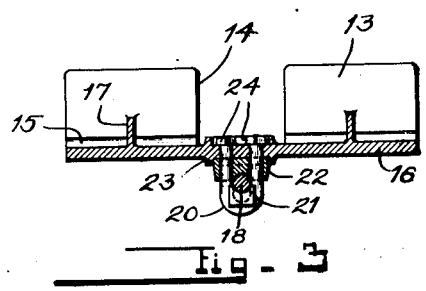
Fig. 3 is a section along the line 3—3 in Fig. 2, looking in the direction of the arrows.

10 represents a vehicle wheel provided with a double tread 11. A plurality of shoes such as 12 is arranged around the periphery of said tread, each of said shoes having the general form of a channel iron provided with the fins 13 for contacting with the ground. Said fins, instead of being continuous as in the normal form of channel iron, are cut away as at 14 in Fig. 3 to prevent the creation of a vacuum between said fins and thereby prevent mud caking.

On the portion of the shoe 12 adjacent the tread 11, a plurality of corrugations 15 are formed, said corrugations extending only across that portion of the shoe 12 in contact with tread 11, leaving the flat area 16 therebetween. Ribs 17 extend between the fins 13, serving both to strengthen the shoe and to prevent side skidding.

Each of the shoes 12 is secured to a cable 18 which is loosely mounted in the groove 19 between the treads 11. The method of securing said shoes to said cable is by a U-shaped clamp 20 which embraces a bearing cap 21, adapted to bear against one portion of the surface of the cable 18, and which extends through a bearing block 22, adapted to bear against the opposite side of said cable. The block 22 is mounted in a recess 23 formed in the inner side of the shoe 12. The limbs of the clamp 20 extend through the block 22 and through the portion 16 of the shoe 12, nuts 24 being provided to clamp the cable 18 between the cap 21 and the block 22. As shown in Figs. 1, 6, 7, 9 and 10, the cap 21 and the block 22 engage with the cable 18 for a short distance on each side of the clamp 20, thereby localizing a small portion of said cable and preventing excessive wear due to the bending stresses set up therein by the pivoting action of the shoes hereinafter described.

This pivoting action of the shoes arises by reason of the fact that the cable 18 is loosely mounted between the treads 11 and also because of the relatively small diameter of the means used to secure the shoe 12 to said cable when compared with the length or width of said shoe. Each shoe, therefore, possesses a certain freedom of action relative to the tread 11 which permits it not only to rock in directions parallel with the plane of the wheel, but also at right angles thereto. Hence the shoes 12 are connected to the cable 18 by what is substantially a universal joint.

Figure 1:
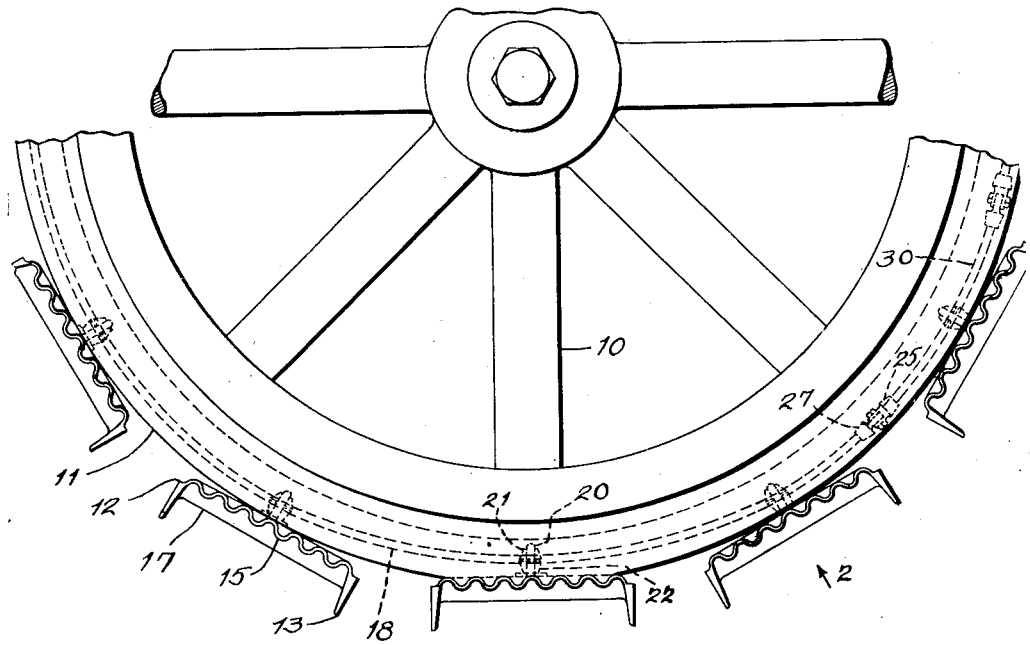
Fig. 1 is a view of a portion of a wheel provided with a double tread and equipped with my improved traction device.
Figure 2:
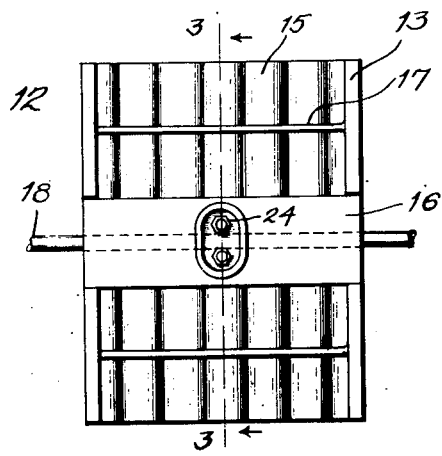
Fig. 2 is a view of one of the shoes comprising my device looking in the direction of the arrow 2 in Fig. 1.
Figure 4:
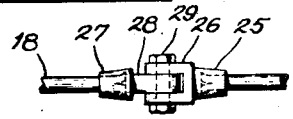
Fig. 4 is an enlarged view of one method of securing the ends of the cable to which the shoes comprising my device are attached.

One end of the cable 18 is secured in a socket 25 provided with a clevis 26 and the other end of said cable is secured in a socket 27 provided with an eye 28, said eye being mounted within said clevis and secured thereto by means of the bolt 29. The cable 18 may be continuous in length and joined only at its ends as shown in Fig. 4, or it may be provided with any desired number of segments 30 as shown in Fig. 1, whereby any shoe or plurality of shoes may be detached from my traction device in order to permit its application to wheels of smaller diameter.

Figure 8:
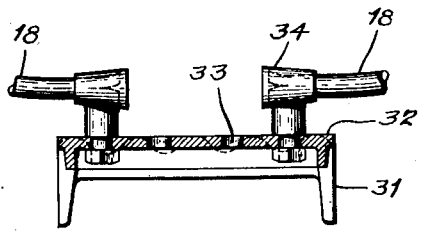
Fig. 8 is a sectional elevation of a special form of shoe, one of which may be used with each wheel in order to absorb the slack in the cable to which the shoes are secured, as the tread wears.

If said device is to be permanently used with wheels of the same diameter, the special form of shoe 31 may be used to secure the ends of the cable 18. It is contemplated that one or more of said shoes shall be used with each wheel, the same being identical in construction with the shoes 12 heretofore described, except that the flat portion 32 thereof is provided with a plurality of holes 33 disposed in line. Sockets 34 are mounted in said holes and the ends of the cable are secured in said sockets. In Fig. 8, the sockets 34 are positioned in the outermost holes 33 which is the condition obtaining before the tread has become worn. When this condition occurs, the sockets 34 are moved toward each other and mounted in the innermost holes 33 thereby taking up excessive slack in the cable 18.

The operation of my improved traction device is as follows:—

The pivotal action of the shoes 12 with reference to the treads 11 has been discussed in detail in the application hereinbefore noted and will therefore not be set forth at length in the present application. For the purposes of this application Figs. 11 and 12 indicate in a diagrammatic way the peculiar action of the shoes 12.

Assume that the wheel 10 is rotating in the direction of the arrow 35 in said figures and that the shoe 36 has reached the position in contact with the ground shown in Fig. 11. As said wheel rotates, the adjacent shoe 37 is brought into contact with the ground and immediately begins to carry a portion of the load. Inasmuch as the first element of the shoe 37 to contact with the ground is the fin 38, it follows that said shoe, due to its substantially pivotal connection with the cable 18 will be rotated until the other fin 39 of said shoe is also in contact with the ground as shown in Fig. 12. Since the action of the shoe 36, as it moves toward the left in said figure, is the reverse of that described for the shoe 37, it is apparent that there will always be a full tractive effort exerted by at least one shoe and at certain instants during the rotation of the wheel by two shoes. Hence, the largest possible portion of my traction device is always in contact with the ground.

The driving connection between the wheel 10 and my traction device is obtained by the interaction of the tread 11 with the shoe, or shoes, 12 in contact with the ground at any instant. The load superimposed on the wheel 10 causes the elastic material of which the tread is composed to flow into the depressions of the corrugations 15 and so effect a gear-like, or in reality a frictional engagement of said tread with said shoe. A further advantage of this mode of securing a driving engagement of the shoes 12 with the wheel 10 is the ability of the former to creep around the treads 11 and so prevent undue wear of the latter and of the shoes.

The prevention of mud caking within the shoes 12 by reason of the separated fins 13 has already been noted, as has also the provision of the shoe 31 for absorbing the slack of the cable 18 as the treads 11 wear.

Thus it can be seen that my device provides a means, not only for obtaining the utmost traction, but attains this result without the necessity of a positive locking of said device with the wheel. It is to be understood, however, that while I have shown one preferred form of my invention, the disclosure is for the purpose of illustration only and in nowise to limit my invention to the exact elements and combinations thereof shown, for many changes may be made in same without departing from the spirit of my invention.

I claim:—

1. The combination with a wheel, of a plurality of shoes disposed around the tread thereof and capable of pivotal movement relative thereto, said shoes being adapted to creep around said tread during the operation of said wheel in order to prevent excessive wear at separated portions thereof, and means for securing a driving engagement of said shoes with said tread.

2. The combination with a wheel, of a plurality of shoes disposed around the tread thereof, flexible attaching means loosely mounted adjacent the periphery of said tread, said shoes being substantially pivotally connected to said flexible means and adapted to creep around said tread during the operation of said wheel in order to prevent excessive wear at separated portions thereof, and means for securing a driving engagement of said shoes with said tread.

3. The combination with a wheel, of a plurality of shoes disposed around the tread thereof, said shoes being provided with roughened surfaces in contact with said tread, adapted to operatively engage therewith during the revolution of said wheel.

4. The combination with a wheel provided with a double tread, of a plurality of shoes disposed around said tread, each shoe comprising a channel iron having a base provided with corrugations extending transversely across each element of said tread, and a cable to which said shoes are secured loosely mounted in the groove between the elements of said tread.

5. The combination with a wheel provided with a double tread, of a plurality of shoes disposed around said tread, one or more of said shoes having a plurality of holes registering with the groove between the elements of said tread and all of said shoes comprising channel irons having bases provided with corrugations extending transversely across each element of said tread, and a cable to which said shoes are secured loosely mounted in the groove between the elements of said tread, the ends of said cable being secured in detachable sockets mounted in said holes.

6. The combination with a wheel, of a cable loosely mounted adjacent the tread thereof, a plurality of shoes disposed around said tread and substantially pivotally secured to said cable, said shoes being adapted to creep around said tread during the operation of said wheel in order to prevent excessive wear at separated portions thereof, and means for securing a driving engagement of said shoes with said tread.

7. The combination with a wheel, of a cable loosely mounted adjacent the tread thereof, a plurality of shoes disposed around said tread and substantially pivotally secured to said cable, said shoes being provided with roughened surfaces in contact with said tread, and adapted to operatively engage therewith during the revolution of said wheel.

8. The combination with a wheel provided with a double tread, of a cable mounted in the groove between the elements of said tread, and a plurality of shoes disposed around said tread and substantially pivotally secured to said cable, each of said shoes comprising a channel iron having a base provided with corrugations extending transversely across each element of said tread.

9. The combination with a wheel, of a cable loosely mounted adjacent the tread thereof, a plurality of shoes disposed around said tread, said shoes being provided with roughened surfaces in contact with said tread and adapted to operatively engage therewith during the revolution of said wheel.

10. The combination with a wheel provided with a double tread, of a cable loosely mounted in the groove between the elements of said tread, and a plurality of shoes disposed around said tread and substantially pivotally secured to said cable, each of said shoes comprising a channel iron having a base provided with corrugations extending transversely across each element of said tread and adapted for a rocking movement relative to said tread.

11. The combination with a wheel provided with a double tread, of a cable mounted in the groove between the elements of said tread, a plurality of shoes disposed around said tread and secured to said cable, one of said shoes having a plurality of holes registering with said groove, and a socket secured to each end of said cable and detachably mounted in one of said holes.

In testimony whereof, I affix my signature.

OTHO F. HIPKINS.